(12) United States Patent
Aydin

(10) Patent No.: US 11,406,117 B2
(45) Date of Patent: Aug. 9, 2022

(54) GEL-COMPRISING CARTRIDGE FOR THE PREPARATION OF CONFECTIONERY

(71) Applicant: KATJES FASSIN GMBH. + CO. KOMMANDITGESELLSCHAFT, Emmerich (DE)

(72) Inventor: Bülent Aydin, Bocholt (DE)

(73) Assignee: KATJES FASSIN GMBH. + CO. KOMMANDITGESELLSCHAFT, Emmerich (DE)

( * ) Notice: Subject to any disclaimer, the term of this patent is extended or adjusted under 35 U.S.C. 154(b) by 0 days.

(21) Appl. No.: 15/754,130

(22) PCT Filed: Aug. 18, 2016

(86) PCT No.: PCT/EP2016/069623
§ 371 (c)(1),
(2) Date: Feb. 21, 2018

(87) PCT Pub. No.: WO2017/032689
PCT Pub. Date: Mar. 2, 2017

(65) Prior Publication Data
US 2018/0242611 A1    Aug. 30, 2018

(30) Foreign Application Priority Data

Aug. 21, 2015  (EP) ................................ 15002490
Aug. 24, 2015  (EP) ................................ 15002500

(51) Int. Cl.
*A23G 3/02*     (2006.01)
*A23G 3/50*     (2006.01)
(Continued)

(52) U.S. Cl.
CPC .............. *A23G 3/50* (2013.01); *A21D 13/00* (2013.01); *A23G 3/0257* (2013.01); *A23G 3/34* (2013.01);
(Continued)

(58) Field of Classification Search
CPC .......... A23G 3/0257; A23G 3/34; A23G 3/50; A23G 3/42; A23P 20/20; A23P 30/00; A21D 13/00
See application file for complete search history.

(56) References Cited

U.S. PATENT DOCUMENTS 3,367,783 A   2/1968   Billerback
4,501,544 A   2/1985   Akutagawa
(Continued)

FOREIGN PATENT DOCUMENTS

CN   102438463 A   5/2012
CN   102907553 A   2/2013
(Continued)

OTHER PUBLICATIONS

Lipton et al "Adventures in Printing Food" pp. 1-9 May 31, 2013 https://spectrum.ieee.org/consumer-electronics/gadgets/adventures-in-printing-food (Year: 2013).*
(Continued)

*Primary Examiner* — Vera Stulii
(74) *Attorney, Agent, or Firm* — Meunier Carlin & Curfman LLC

(57) ABSTRACT

The invention generally relates to a cartridge comprising a gel. The invention further relates to a process for the preparation of an item of confectionery, an item of confectionery, a kit, the use of a cartridge for preparing an item of confectionery, a gel, and a process for preparing an item of confectionery via a data connection. The invention relates to a cartridge comprising the following cartridge components: a. a container having an internal volume; b. a gel comprising: i. a hydrocolloid, and ii. a sweetener different to the hydrocolloid; wherein the gel is not a fluid.

15 Claims, 8 Drawing Sheets

Figure 1:
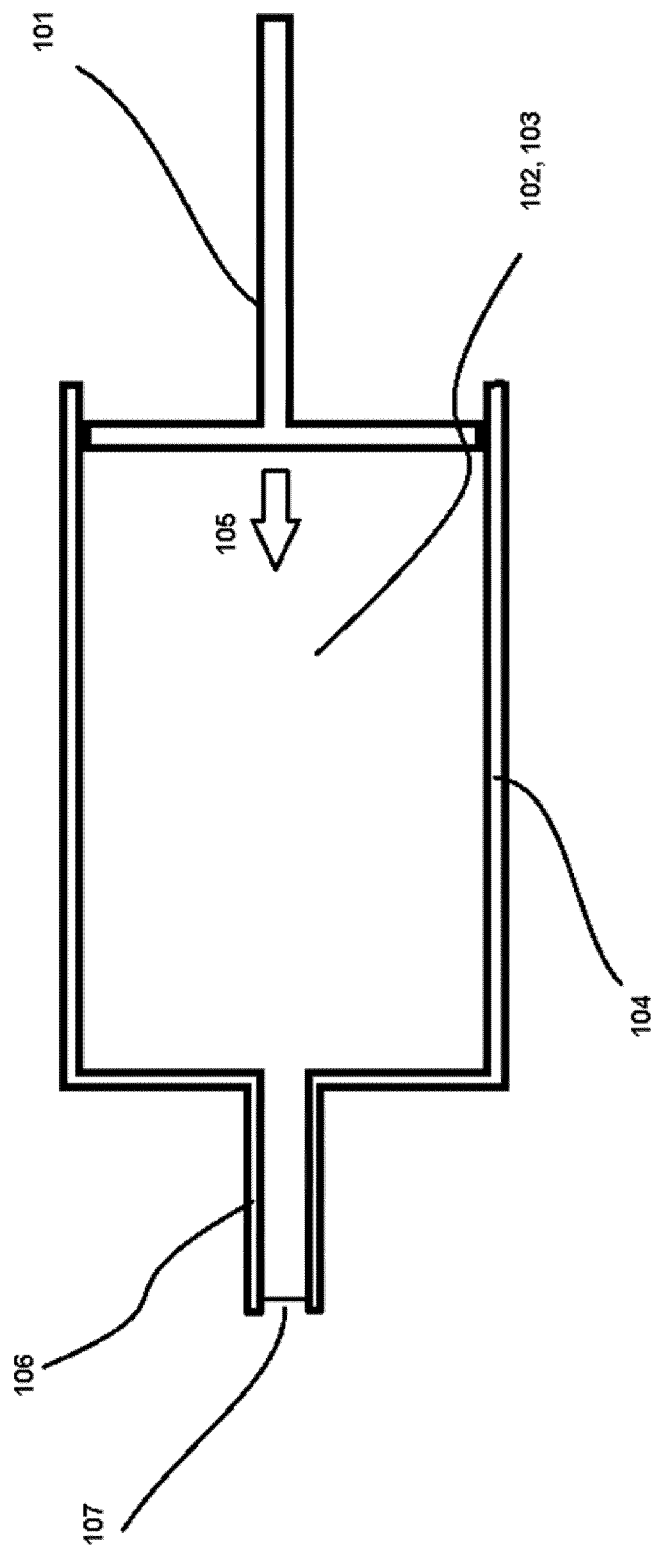

(51) Int. Cl.
    *A23P 20/20*     (2016.01)
    *A23P 30/00*     (2016.01)
    *A21D 13/00*     (2017.01)
    *A23G 3/34*     (2006.01)
    *A23G 3/42*     (2006.01)
    *A23P 20/25*     (2016.01)

(52) U.S. Cl.
    CPC ............... *A23G 3/42* (2013.01); *A23P 20/20* (2016.08); *A23P 30/00* (2016.08); *A23P 2020/253* (2016.08); *A23V 2002/00* (2013.01)

(56) References Cited

U.S. PATENT DOCUMENTS

| | | | |
|---|---|---|---|
| 5,607,716 A * | 3/1997 | Doherty | A23G 3/36 426/660 |
| 5,932,272 A * | 8/1999 | Raemy | A23J 3/08 426/573 |
| 6,200,125 B1 | 3/2001 | Akutagawa | |
| 6,268,000 B1 | 7/2001 | Romer | |
| 6,460,736 B1 | 10/2002 | D Agostino | |
| 7,223,428 B2 | 5/2007 | Willcocks et al. | |
| 2002/0152927 A1 | 10/2002 | Russell | |
| 2005/0061184 A1 | 3/2005 | Russell | |
| 2006/0044705 A1 | 3/2006 | Hasegawa et al. | |
| 2007/0160707 A1 | 7/2007 | Garcia | |
| 2007/0224312 A1 * | 9/2007 | Aldridge | B65D 75/30 426/5 |
| 2011/0268837 A1 | 11/2011 | Jani | |

FOREIGN PATENT DOCUMENTS

| | | |
|---|---|---|
| CN | 104590771 A | 5/2015 |
| EP | 0414293 A2 | 2/1991 |
| EP | 1104652 A1 | 6/2001 |
| EP | 1964476 A2 | 9/2008 |
| EP | 2820957 A4 | 12/2015 |
| GB | 2204223 A | 11/1988 |
| WO | 2005069866 A2 | 8/2005 |

OTHER PUBLICATIONS

3DVentures YouTube, pp. 1-7, Aug. 16, 2014 https://www.youtube.com/watch?v=wtWgd1T8vTo (Year: 2014).*
Kickstarter https://www.kickstarter.com/projects/977921690/candy-the-first-confectionery-focused-food-3d-prin Aug. 27, 2014 pp. 1-7 (Year: 2014).*
International Search Report and Written Opinion issued in related International Application No. PCT/EP2016/069623 dated Oct. 24, 2016, pp. 1-14.
Office Action relating to Chinese Application No. 201680046856.X, dated May 21, 2020, pp. 1-12.

* cited by examiner

400

700

704

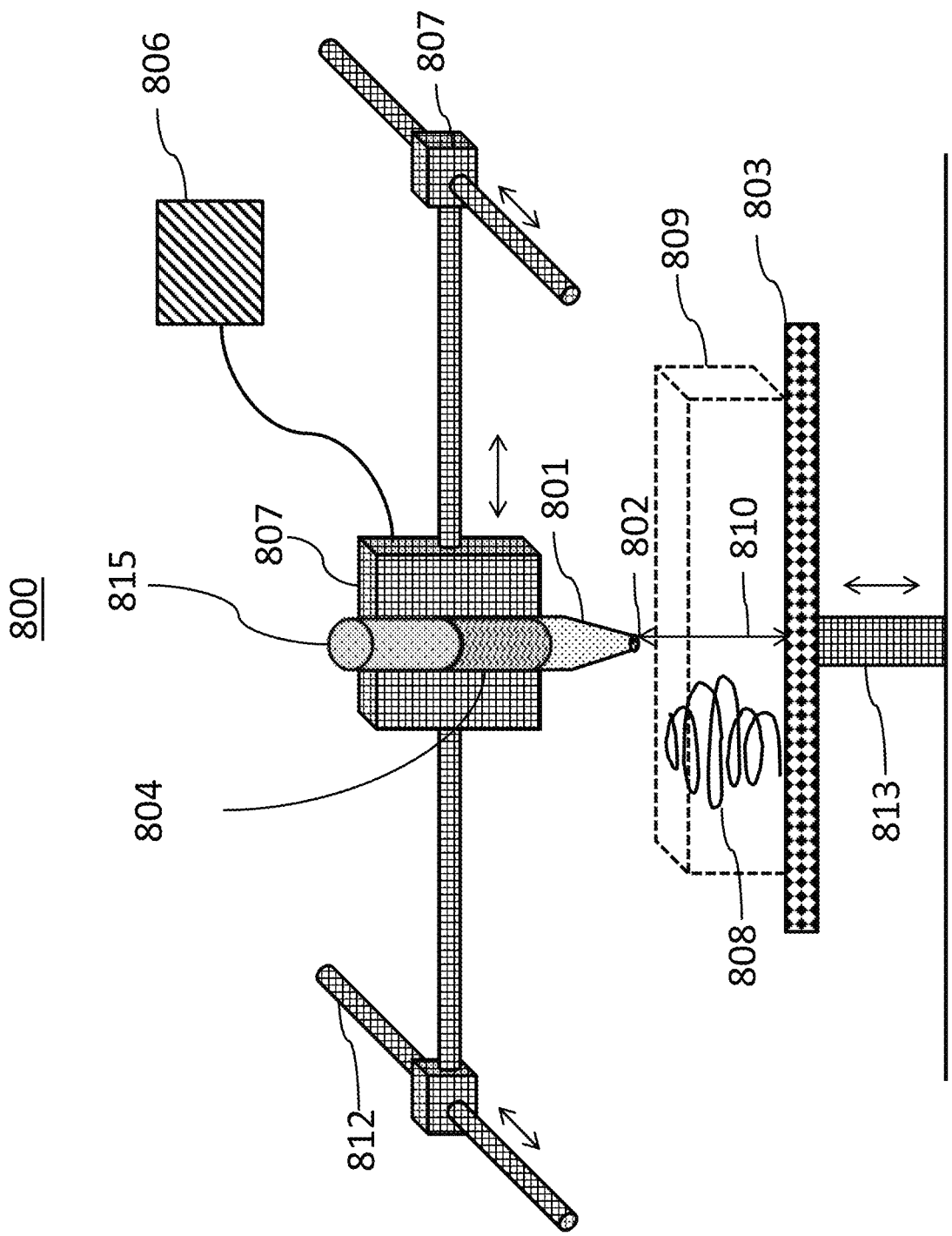

GEL-COMPRISING CARTRIDGE FOR THE PREPARATION OF CONFECTIONERY

FIELD OF THE INVENTION

The invention generally relates to a cartridge comprising a gel. The invention further relates to a process for the preparation of an item of confectionery, an item of confectionery, a kit, the use of a cartridge for preparing an item of confectionery, a gel, and a process for preparing a confectionery item via a data link.

BACKGROUND

Confectionery items and methods for preparing confectionery items can be found in the art.

U.S. Pat. No. 6,200,125 describes a method for manufacturing a decorative confectionary article by means of heating masses which differ to each other and then feeding them via a nozzle to a surface.

US2006044705 describes a confection comprising a base composition, at least one high-potency sweetener and at least one sweet taste improving composition.

U.S. Pat. No. 7,223,428 describes a method for manufacturing a decorative confectionary article by means of feeding a batch of confectionary mass into a molding device.

U.S. Pat. No. 4,501,544 involves producing a confectionary article by means of preparing a first confectionary mass and a basic confectionary mass, wherein the first confectionary mass is heated and added to a mold in batches. This mold is exposed to a vibration in order to compact the confectionary mass before a second mold is connected to the first mold and the basic confectionary mass is introduced to said second mold in order to produce the end product.

EP2820957 describes a method for manufacturing an embossed decorative element for a confectionary article which involves the use of a mold.

BRIEF DESCRIPTION

The invention is generally based on the object of providing improved processes for the preparation of confectionery items. More specifically, it is an object of the invention to provide a process which is more efficient or flexible or both.

One particular object of the invention is to provide a process for the preparation of confectionery items which might be suitable for vegetarians, in particular processes which are also more efficient, more flexible or both.

A contribution to achieving at least one of the above described objects is made by the subject matter of the category forming claims of the invention. A further contribution is made by the subject matter of the dependent claims of the invention which represent specific embodiments of the invention.

DETAILED DESCRIPTION

A contribution to achieving at least one of the above described objects is made by the following embodiments.

|1| A cartridge comprising the following cartridge components:
  a. a container having an internal volume;
  b. a gel comprising:
    i. a hydrocolloid, preferably a poly sugar, more preferably a pectin; and
    ii. a sweetener different to the hydrocolloid;
  wherein the gel is not a fluid.

In a preferred aspect of this embodiment, the gel occupies at least about 50%, preferably at least about 75%, more preferably at least about 90%, further more preferably at least about 99%, most preferably at least about 99.9% of the internal volume. In this aspect, it is further preferred that the gel substantially fills the container, preferably free of bubbles.

|2| The cartridge according to embodiment |1|, wherein the hydrocolloid is a poly sugar, preferably a pectin.

|3| The cartridge according to embodiment |1| or |2|, wherein the gel comprises an acid.

|4| The cartridge according to any of the preceding embodiments, wherein the sweetener is a monosaccharide or a disaccharide.

|5| The cartridge according to any of the preceding claims, wherein the sweetener is present in the gel in the range from about 10 to about 80 wt. %, preferably in the range from about 40 to about 80 wt. %, more preferably in the range from about 50 to about 80 wt. %, based on the weight of the sweetener and the total weight of the gel.

|6| The cartridge according to any of the preceding embodiments, wherein the container is configured to allow its internal volume to be reduced.

|7| The cartridge according to any of the preceding embodiments, wherein the gel has the following properties:
  a. Upon heating to 80° C., or 70° C., or 65° C. or 60° C. it becomes a paste, wherein the paste is more fluid than the gel;
  b. Upon subsequent cooling to below 10° C., or below 20° C., or below 25° C. or below 30° C., it becomes a gel, wherein the gel is not a fluid.

In one aspect of this embodiment, the first gel has a higher degree of cross-linking than the second gel. In one aspect of this embodiment, the second gel is not cross-linked. In one aspect of this embodiment, it is preferred that the gel turns into a paste in a temperature range from about 45 to about 100° C., preferably in the range from about 50 to about 85° C., more preferably in the range from about 60 to about 70° C.

|8| The cartridge according to any of the preceding embodiments, wherein the hydrocolloid is a pectin.

|9| The cartridge according to any of the preceding embodiments, further comprising a pH buffer. The pH buffer is preferably comprised in the gel.

|10| The cartridge according to any of the preceding claims, wherein the gel comprises the hydrocolloid in the range from about 1 to about 10 wt. %, preferably in the range from about 2 to about 7 wt. %, more preferably in the range from about 2.5 to about 6 wt. % based on the weight of the hydrocolloid and the total weight of the gel.

|11| The cartridge according to any of the preceding claims, wherein the gel has an acid content, as determined by the method given in this application, in the range from about 0.3 to about 3 wt. %, preferably in the range from about 0.5 to about 2.5 wt. %, more preferably in the range from about 0.8 to about 2 wt. %, based on the weight of acid and the total weight of the gel.

|12| The cartridge according to any of the preceding embodiments, wherein the gel comprises water in the range from about 5 to about 45 wt. %, preferably in the range from about 10 to about 30 wt. %, more preferably in the range from about 15 to about 24 wt. %.

|13| The cartridge according to any of the preceding claims, wherein the gel satisfies one or more of the following criteria:
  a. Shore hardness A in the range from about 1 to about 70, preferably in the range from about 2 to about 50, more preferably in the range from about 3 to about 30, still more preferably in the range from about 4 to about 20, measured at 25° C.;
  b. Complex viscosity in the range from about 2000 to about 10000 Pa·s, preferably in the range from about 2200 to about 8000 Pa·s, more preferably in the range from about 2400 to about 6000 Pa·s;
  c. Loss modulus in the range from about 4000 to about 20000 Pa, preferably in the range from about 4500 to about 18000 Pa, more preferably in the range from about 5000 to about 15000 Pa;
  d. Storage modulus in the range from about 20000 to about 70000 Pa, preferably in the range from about 22000 to about 60000 Pa, more preferably in the range from about 25000 to about 50000 Pa.

In an aspect of this embodiment, a combination of the above criteria is satisfied selected from the group consisting of: a, b, c, d, ab, ac, ad, bc, bd, cd, abc, abd, acd, bcd and abcd; preferably selected from the group consisting of b, c, d, bc, bd and cd.

|14| The cartridge according to any of the preceding embodiments, wherein the pH of the gel is in the range from about 2 to about 5.5, preferably in the range from about 3 to about 5, more preferably in the range from about 3.5 to about 4.5, most preferably in the range from about 3.8 to about 4.2.

|15| A process for preparing an item of confectionery comprising the following process steps:
  a. Providing a cartridge according to any of the preceding embodiments;
  b. Heating the cartridge to turn the gel into a paste;
  c. Ejecting the paste from the cartridge to obtain a shaped body;
  d. Cooling the shaped body.

|16| The process according to embodiment |5|, wherein the paste is ejected through an outlet which traces a 3-D trajectory in the ejection step c.

|17| An item of confectionery obtainable by a process according to embodiment 1|5| or |6|.

|18| An item of confectionery comprising a hydrocolloid and an acid different to the hydrocolloid, wherein the weight of the hydrocolloid is greater than the weight of the acid, wherein the weight of acid is determined by the test method given in this application. In a preferred aspect of this embodiment, the ratio of the weight of the hydrocolloid to the weight of the acid is in the range from about 0.5:1 to about 8:1, preferably in the range from about 1:1 to about 5:1, more preferably in the range from about 2:1 to about 4:1.

|19| An item of confectionery according to embodiment |17| or |18|, comprising a wall; wherein the wall is characterised by a wall-thickness in the range from about 0.5 to about 4 mm, preferably in the range from about 0.5 to about 3 mm, more preferably in the range from about 0.5 to about 2 mm.

|20| An item of confectionery according to any of the embodiments |17| to |19| comprising a basal surface, wherein the item of confectionery is characterised by a line of height perpendicular to the basal surface defining height above the basal surface and a diameter extending perpendicular to the line of height, wherein the length of the diameter depends on the height as a non-monotonic function. The basal surface is preferably suitable for standing the confectionery item in a stable position.

|21| An item of confectionery according to any of the embodiments |17| to |20|, comprising a hole, wherein the hole has a depth of at least about 3 mm, preferably at least about 4 mm, more preferably at least about 5 mm, further more preferably at least about 7 mm, and most preferably at least about 10 mm.

|22| An item of confectionery according to any of the embodiments |17| to |21|, not having more than about 0.05 wt. %, preferably not more than about 0.03 wt. %, more preferably not more than about 0.01 wt. %, flour on its entire surface, the wt. % of flour being based on the total weight of the item of confectionery.

|23| An item of confectionery according to any of the embodiments |17|, |18|, |19|, |21| or |22|, having no basal surface.

|24| A kit comprising two or more cartridges according to any of the embodiments |1| to |14|.

|25| The kit according to embodiment |24|, wherein the gels of two or more of the cartridges differ from each other in one or more of the following properties:
  a. Flavour;
  b. Colour;
  c. Calorie content;
  d. Consistency, wherein the consistency is preferably one or more selected from the group consisting of: texture and density.

In preferred aspects of this embodiment, one of the following combinations of criteria are satisfied: a, b, c, d, ab, ac, ad, bc, bd, cd, abc, abd, acd, bcd or abcd.

In a first aspect of this embodiment, the kit contains 2 different types of cartridge. In a second aspect of this embodiment, the kit contains 3 different types of cartridge. In a third aspect of this embodiment, the kit contains 4 different types of cartridge. In a fourth aspect of this embodiment, the kit contains 5 different types of cartridge. In a fifth aspect of this embodiment, the kit contains 6 different types of cartridge.

In further aspects of this embodiment, the kit further comprises a data item, preferably selected from the group consisting of: a shape, an access code, a design.

|26| A use of a cartridge according to any of the embodiments |1| to |14| or a kit according to embodiment |24| or |25| for obtaining an item of confectionery.

|27| The use according to embodiment |26|, wherein the confectionery item is obtained by printing.

|28| A use of a composition comprising:
  a. A hydrocolloid, preferably a poly sugar, more preferably a pectin,
  b. an acid different from the hydrocolloid;
for filling a cartridge, wherein the weight of hydrocolloid is greater than the weight of the acid. In a preferred aspect of this embodiment, the ratio of the weight of the hydrocolloid to the weight of the acid is in the range from about 0.5:1 to about 8:1, preferably in the range from about 1:1 to about 5:1, more preferably in the range from about 2:1 to about 4:1.

|29| A gel comprising:
  a. A hydrocolloid, and
  b. An acid different from the hydrocolloid;
wherein the gel is not a fluid, wherein the gel has the following properties:
  i. Upon heating to 80° C., or 70° C., or 60° C., it becomes a paste, wherein the paste is more fluid than the gel;

ii. Upon subsequent cooling to below 10° C., or below 20° C., or below 30° C., it becomes a gel, wherein the gel is not a fluid.

The features of the gel introduced in the embodiments relating to the cartridge also represent preferred features of the gel according to embodiment 1291.

|30| The gel according to embodiment 1291, comprising a sweetener in the range from about 10 to about 80 wt. %, preferably in the range from about 40 to about 80 wt. %, more preferably in the range from about 50 to about 80 wt. %.

|31| A use of the gel according to embodiment 1291 or 1301 for printing.

A further aspect of the invention relates to a process for preparing an item of confectionery via a data connection.

|A1| A process for making a confectionary item comprising the following process steps:
   a. Inputting through a first computer one or more items of confectionary data, wherein one or more of the confectionary data items is selected from the group consisting of:
      i. A Shape,
      ii. A Size,
      iii. A Colour,
      iv. A Flavour,
      v. A surface finish, and
      vi. A Surface pattern;
      vii. A consistency, wherein the consistency is preferably one or more selected from the group consisting of: a texture and a density;
   b. Transmitting the inputted confectionary data items from the first computer to a second computer;
   c. Preparing through the second computer one or more confectionary items based on the inputted confectionary data items.

|A2| The process according to embodiment |A1|, wherein the transmission of step b. is performed through an internet service provider. In one aspect of this embodiment, the first computer and the second computer are located on different private networks. In one aspect of this embodiment, the transmission travels at least about 500 m, preferably at least about 1 km, more preferably at least about 2 km, most preferably at least about 3 km.

|A3| The process according to embodiment |A1|, wherein the transmission of step b. is performed within a local network. In one aspect of this embodiment, the first computer and the second are physically separated by a distance of less than about 200 m, preferably less than about 20 m, more preferably less than about 10 m, most preferably less than about 5 m.

|A4| The process according any of the embodiments |A1| to |A3|, wherein one or more of the inputted confectionary data items is selected from a predetermined list. In one aspect of this embodiment, the predetermined list comprises one or more of the following:
   i. A list of shapes, preferably comprising one or more of the following: a 2-dimensional shape, preferably one or more selected from the group consisting of: circle, square, oval, rectangle and rhombus; a 3-dimensional shape, preferably one or more selected from the group consisting of: cuboid, cylinder, sphere, truncated cone, square based pyramid, truncated square based pyramid, rectangular based pyramid, truncated rectangular based pyramid, an animal, a heart, a fruit, a star, a bottle and a ring.
   ii. A list of sizes, preferably comprising one or more selected from the group consisting of: a first volume, a second volume, greater than the first, and a third volume, greater than the second. The first volume, second volume and third volume are often referred to as small, medium and large, respectively.
   iii. A list of colours, preferably comprising one or more from the group consisting of: red, blue, yellow, green, orange, purple, brown, black, white and pink.
   iv. A list of flavours, preferably comprising one or more from the group consisting of: a fruit flavour, cola, mint, liquorice, aniseed, and cinnamon.
   v. A list of surface finishes, preferably comprising one or more coatings selected from the group consisting of: sugar, sour, salt and fizzy. In one aspect of this embodiment, the coating is in the range from about 0.01 to about 5 wt. %, preferably in the range from about 0.1 to about 4 wt. %, more preferably in the range from about 1 to about 3 wt. % of the total weight of the confectionery item.
   vi. A list of surface patterns, preferably comprising one or more selected from the group consisting of: writing and an image;

|A5| The process according to any of the embodiments |A1| to |A4|, wherein at least two different inputted items of confectionary data can be inputted independently of each other. In one aspect of this embodiment, the confectionery data items are selected from two or more lists, wherein the items of two or more of the lists can be chosen independently of each other.

|A6| The process according to any of the embodiments |A1| to |A5|, wherein the process step c. comprises the following step:
   C1. Providing a confectionary precursor material based on the inputted data items.

|A7| The process according to embodiment |A6|, wherein step C1 comprises the step of selecting a precursor supply based on the inputted confectionary data items. In one aspect of this embodiment, the precursor supply is a cartridge, preferably a cartridge according to the invention.

|A8| The process according to any of the embodiments |A1| to |A7|, wherein one or more of the inputted confectionary data items is/are a 3-dimensional shape. In one aspect of this embodiment, the 3-dimensional shape is a 3-dimensional photo.

|A9| The process according to any of the embodiments |A1| to |A8|, wherein the preparation step c. comprises forming.

|A10| The process according to any of the embodiments |A1| to |A9|, wherein the preparation step c. comprises printing.

|A11| The process according to embodiment |A10|, wherein during the printing step an outlet of the printer traces a 3-dimensional trajectory.

|A12| The process according to any of the embodiments |A1| to |A11|, wherein the total weight of confectionary items prepared in process step c. is less than about 5 kg, preferably less than about 2 kg, more preferably less than about 1 kg, most preferably less than about 500 g.

|A13| The process according to any of the embodiments |A1| to |A12|, wherein the inputting is performed via an app. In a preferred aspect of this embodiment, the app is installed on a smart phone or a tablet computer, preferably a smart phone.

|A14| The process according to any of the embodiments |A1| to |A13|, wherein the inputting is performed by a natural person on behalf of the same natural person.

Item of Confectionery

Preferred items of confectionery according to the invention are sugar confectionery. Preferred items of confectionery are soft confectionery items, hard confectionery items or hybrid confectionery items having one or more hard sections and one or more soft sections; preferably soft confectionery items. Preferred soft confectionery items are elastically deformable. A preferred soft confectionery item has a Shore hardness A in the range from about 1 to about 70, preferably in the range from about 2 to about 50, more preferably in the range from about 3 to about 30, more preferably in the range from about 4 to about 20, measured at 25° C. A preferred soft confectionery item is one or more selected from the group consisting of: a fruit gum, a wine gum, a toffee and a chewy sweet. Preferred hard confectionery items are one or more selected from the group consisting of: a boiled sweet and a hard toffee.

In one embodiment, preferred items of confectionery are preferably substantially chocolate free. In one embodiment, the confectionery item comprises less than about 0.5 g/kg, preferably less than about 0.2 g/kg, more preferably less than about 0.1 g/kg of theobromine or a theobromine derivative or both. The item of confectionery is preferably substantially free of theobromine or a theobromine derivative or both.

In one embodiment, the item of confectionery is substantially free of cocoa butter. In one embodiment, the item of confectionery comprises less than about 15 wt. %, preferably less than about 5 wt. %, more preferably less than about 0.1 wt. % cocoa butter.

In one embodiment of the invention, the item of confectionery has a non-moldable shape. Preferred shapes are embodied in the claims and the figures section.

In one embodiment, the confectionery item has a water content in the range from about 1 to about 20 wt. %, preferably in the range rom about 5 to about 20 wt. %, more preferably in the range from about 10 to about 20 wt. %, most preferably in the range from about 15 to about 20 wt. %, based on the total weight of the confectionery item.

Hydrocolloid

The gel of the invention comprises a hydrocolloid. Preferred hydrocolloids are suitable for forming a gel with water. A preferred hydrocolloid is one or more selected from the group consisting of: a poly sugar, a peptide and a poly peptide; preferably a poly sugar.

Poly Sugar

In one embodiment, the hydrocolloid is a poly sugar. Preferred poly sugars are molecules built from at least 3, preferably at least 10 and more preferably at least 20 sugar units. In one embodiment the poly sugar is a homo sugar. In another embodiment, the poly sugar is a hetero sugar. The poly sugar preferably comprises at least about 50 wt. %, more preferably at least about 65 wt. %, most preferably at least about 65 wt. % galacturonic acid, preferably α-D-galactonic acid. Another preferred sugar unit is Rhamnose. Furthermore, it is preferred that the hydroxy groups on the $C_2$ or $C_3$ atom of the galactonic acid units are at least partially acetylated or substituted with further natural sugars, in particular D-Galactose, D-Xylose, L-Arabinose or L-Rhamnose. Furthermore, it is preferred that the poly sugar is branched. The poly sugar is preferably branched at galactonic acid of the main chain.

Furthermore, it is preferred that the poly sugar is at least partially esterified, wherein esterification with an alcohol, preferably an alcohol of a $C_1$ to $C_{10}$ hydrocarbon, more preferably of a $C_1$ to $C_5$ hydrocarbon and particularly preferably of a $C_1$ to $C_3$ hydrocarbon, is preferred. Esterification with methanol is particularly preferred. It is preferred that between about 50 and about 80%, preferably between about 52 and 70%, more preferably between about 55 and 65%, most preferably between about 59 and about 61%, of the carboxylic acid groups on the main chain of the poly sugar are esterified.

Preferred poly sugars are one or more selected from the group consisting of: alginate, carrageenan, gellan, agarose, agaropectin and a pectin; preferably a pectin. Preferred pectins are citrus-pectins or apple pectins or both. These are commercially available, for example from Herbstreith & Fox KG Pektin-Fabriken.

The poly sugar preferably has a USA-SAG value (SAG—Strain-induced Alignment in a gel) of at least about 150°, preferably at least about 160°, more preferably at least about 170° USA-SAG. A high USA-SAG value indicates a high degree of esterification.

Polypeptide

Preferred polypeptides are molecules built of at least 10, preferably at least 50, more preferably at least 70 amino acids. Preferred polypeptides have a molecular weight of at least about 10,000 g/mol, preferably at least about 25,000 g/mol, more preferably at least about 100,000 g/mol. In some cases preferred polypeptides might have a molecular weight as high as 300,000 g/mol or less. Preferred polypeptides comprise less than about 5 wt. %, preferably less than about 3 wt. %, more preferably less than about 0.5 wt. %, tryptophan, based on the total weight of the polypeptide. Preferred poly peptides contain no tryptophan. Preferred polypeptides are gelatines. In one embodiment, it is preferred for the polypeptide to have an isoelectric point (IEP) in a pH range from about 4.7 to about 5.3, preferably in the range from about 4.8 to about 5.2, more preferably in the range from about 4.9 to about 5.1. In one embodiment, it is preferred for the polypeptide to have an isoelectric point (IEP) in a pH range from about 7.7 to about 9.2, preferably in the range from about 7.8 to about 9.1, more preferably in the range from about 7.9 to about 9.1, most preferably in the range from about 8 to about 9. Preferred polypeptides have a Bloom value in the range from about 140 to about 300, preferably in the range from about 200 to about 280, more preferably in the range from about 220 to about 270.

Other Constituents of the Gel

Other preferred constituents of the paste are one or more selected from the group consisting of: a milk product, a vegetable fat, an emulsifier, a colorant, an oil, an active ingredient, a plant extract and an aroma. A preferred oil is an essential oil. A preferred essential oil is one or more selected from the group consisting of: a *eucalyptus* oil, a menthol, a mint oil. A preferred active ingredient is one or more selected from the group consisting of: an expectorant, an analgesic and an anti-inflammatory. A preferred plant extract is one or more selected from the group consisting of: a herb, a root and a bark extract. A preferred herb extract is an extract of one or more selected form the group consisting of: sage, plantain, primrose and okra. A preferred root extract is liquorice. A preferred aroma is a synthetic aroma or a natural aroma or both. A further preferred aroma is a fruit aroma. A particularly preferred confectionery item contains no material of animal origin, i.e. it is suitable for consumption by vegans.

Cartridge

A contribution to achieving at least one of the above mentioned objects is made by a cartridge. The cartridge is preferably adapted for containing a confectionery precursor material and for ejecting the confectionery precursor material. In one embodiment, it is preferred for the cartridge to comprise a rigid container having an internal volume.

There are at least two possible aspects of the cartridge. In one embodiment, the container is rigid. Preferably, the rigid container has solid walls, allowing the container to maintain a 3-dimensional hollow form. The rigid container is preferably stackable. In another embodiment, the container is not rigid. The non-rigid container preferably has flexible walls, such as a foil. A preferred non-rigid container is a pouch.

In one preferred embodiment, the container has an exit hole, or provision for an exit hole to be made. Such exit holes are preferably fitments, preferably adjusted to be mounted in a 3-D printer.

In one embodiment, the confectionery precursor material can be ejected by reducing the internal volume of the container. In one aspect of this embodiment, the cartridge comprises a moveable wall at the surface of the internal volume. A preferred movable wall is a plunger, this holds preferably for the rigid container. In the case of the non-rigid container, it is preferred that the container is compressed to cause the confectionery precursor material to be ejected.

In one embodiment, the confectionery precursor material can be ejected by a gas pressure force. A preferred gas pressure force is provided by a pressurised gas supply. Preferred pressurised gas supplies are one or more selected from the group consisting of: a gas jet and a pressurised liquid.

It is preferred according to the invention for the internal volume of the container to be substantially filled by the gel. The gel preferably occupies at least about 90%, more preferably at least about 99%, further more preferably at least about 99.9%, of the internal volume of the container, most preferably all of the internal volume of the container. It is preferred for the gel in the container to be substantially free of air bubbles, preferably with less than about 1%, more preferably less than about 0.1%, further more preferably less than about 0.01% of the internal volume of the container, most preferably none of the internal volume of the container, occupied by air bubbles.

It is preferred according to the invention for the internal volume of the container to be substantially filled by the gel. The gel preferably occupies at least about 90%, more preferably at least about 99%, further more preferably at least about 99.9%, of the internal volume of the rigid container, most preferably all of the internal volume of the rigid container. It is preferred for the gel in the rigid container to be substantially free of air bubbles, preferably with less than about 1%, more preferably less than about 0.1%, further more preferably less than about 0.01% of the internal volume of the rigid container, most preferably none of the internal volume of the rigid container, occupied by air bubbles.

Gels

Preferred gels in the context of the invention are elastically deformable solids. Preferred gels are not fluids, more preferably neither a semi-fluid nor a fluid. In one embodiment, the centre of mass of a 1 $cm^3$ cube of the gel does not drop more than about 2 mm, preferably not more than about 1 mm, more preferably not more than about 0.5 mm, still more preferably not more than about 0.1 mm, over a course of 10 minutes at 25° C. when stood on a flat surface.

In one embodiment, preferred gels have a Shore hardness A in the range from about 1 to about 70, preferably in the range from about 2 to about 50, more preferably in the range from about 3 to about 30, still more preferably in the range from about 4 to about 20, measured at 25° C. In one embodiment, preferred gels have a complex viscosity in the range from about 2000 to about 10000 Pa·s, preferably in the range from about 2200 to about 8000 Pa·s, more preferably in the range from about 2400 to about 6000 Pa·s.

In one embodiment, preferred gels have a loss modulus in the range from about 4000 to about 20000 Pa, preferably in the range from about 4500 to about 18000 Pa, more preferably in the range from about 5000 to about 15000 Pa.

In one embodiment, preferred gels have a storage in the range from about 20000 to about 70000 Pa, preferably in the range from about 22000 to about 60000 Pa, more preferably in the range from about 25000 to about 50000 Pa.

In one embodiment, the gel comprises a cross-linked polymer structure. In another embodiment, the gel does not comprise a cross-linked polymer structure.

In one embodiment, the gel is too firm to be workable or printable.

In one embodiment, a preferred paste cannot be expelled from a 1 ml syringe having a circular exit aperture with a diameter of 1.5 mm and having a circular plunger cross section having a diameter of 15 mm with hand force. In one aspect of this embodiment, the paste cannot be expelled with a force of 20 N, preferably 30 N, more preferably 50 N.

A preferred gel has a density in the range from about 300 to about 2000 g/l, preferably in the range from about 350 to about 1800 g/l, more preferably in the range from 375 to about 1500 g/l. In one embodiment, the gel has a higher density, preferably in the range from about 1100 to about 1500 g/l, preferably in the range from about 1200 to about 1450 g/l, more preferably in the range from about 1300 to about 1400 g/l. In another embodiment, the gel has a lower density, preferably in the range from about 250 to about 550 g/l, preferably in the range from about 300 to about 500 g/l, most preferably in the range from about 350 to about 450 g/l.

Pastes

Preferred pastes in the context of the invention are fluids or semi fluids, preferably semi fluids. Preferred pastes are viscous fluids. A preferred paste is firm enough to hold a shape under its own weight, but not so firm that it is not non-elastically deformable. In one embodiment, a preferred paste can be expelled from a 1 ml syringe having a circular exit aperture with a diameter of 1.5 mm and having a circular plunger cross section having a diameter of 15 mm, preferably with hand force. In one aspect of this embodiment, the paste can be expelled with a force of 50 N, preferably 30 N, more preferably 20 N.

In one embodiment, preferred pastes have a complex viscosity in the range from about 500 to about 3500 Pa·s, preferably in the range from about 1000 to about 3000 Pa·s, more preferably in the range from about 2000 to about 2800 Pa·s.

In one embodiment, preferred pastes have a complex viscosity in the range from about 500 to about 3200 Pa·s, preferably in the range from about 600 to about 2500 Pa·s, more preferably in the range from about 700 to about 2000 Pa·s.

In one embodiment, the paste has a Shore hardness A in the range from about 0.1 to about 20, preferably in the range from about 1 to about 15, more preferably in the range from about 2 to about 5.

In one embodiment, preferred pastes have a loss modulus in the range from about 2000 to about 6300 Pa, preferably in the range from about 3500 to about 5500 Pa, more preferably in the range from about 4000 to about 5000 Pa.

In one embodiment, preferred pastes have a loss modulus in the range from about 2000 to about 6300 Pa, preferably in the range from about 3500 to about 5500 Pa, more preferably in the range from about 3000 to about 5000 Pa.

In one embodiment, preferred pastes have a Storage modulus in the range from about 5000 to about 30000 Pa, preferably in the range from about 16000 to about 28500 Pa, more preferably in the range from about 19000 to about 27000 Pa.

In one embodiment, preferred pastes have a Storage modulus in the range from about 5000 to about 30000 Pa, preferably in the range from about 10000 to about 25000 Pa, more preferably in the range from about 18000 to about 22000 Pa.

Acid

In one embodiment, it is preferred for the gel to comprise an acid distinct from the hydrocolloid. It is preferred that this acid is a Bronsted acid. The Bronsted acid preferably has a pKa in the range from about 3 to about 6.5, preferably two pKas in the range from about 3 to about 6.5, more preferably 3 pKas in the range from about 3 to about 6.5. Reference in this application to the total acid content preferably relates to the total content of acids, conjugate-base anions of acids and anhydrides. Preferred acids are organic acids. Preferred acids comprise two or more than two carboxylic acids groups, preferably three carboxylic acid groups. Preferred acids contain about 2 to about 20, preferably about 2 to about 7, more preferably about 3 to 4 carbon atoms per molecule. In one embodiment, a preferred acid is one or more selected from the group consisting of: oxalic acid, malonic acid, succinic acid, glutaric acid, adipic acid, pimelic acid, suberic acid, azelaic acid, sebacic acid, brassylic acid, citric acid, malic acid and lactic acid. In one embodiment, a preferred acid is an a hydroxy acid, preferably with two or more than two carboxylic acid groups. Preferred a hydroxy acids are one or more selected from the group consisting of: citric acid, malic acid and lactic acid. Citric acid is particularly preferred.

It is preferred according to the invention for the gel to comprise a buffer, preferably comprising one or more of the above mentioned preferred acids. Preferred pH buffers are suitable for reducing the sensitivity of the pH of a system to the amount of added acid or base. A preferred pH buffer preferably comprises a salt, preferably the salt of an acid base neutralisation, preferably a Bronsted acid base neutralisation. The acids, conjugate-base anions and anhydrides of the buffer are all considered to contribute to the total acid content of the paste.

In one embodiment, the buffer comprises a weak acid and its conjugate base. In one aspect of this embodiment, the weak acid and its conjugate base a present in the same molecule. In one embodiment the buffer comprises one or more selected from the group consisting of: a di-acid, a tri-acid and a tetra-acid, and salts thereof, preferably one or more selected from the group consisting of: a di-acid and a tri-acid, and salts thereof. In one embodiment, the buffer comprises a citrate. Preferred citrates are once or twice neutralised citric acid, preferably twice neutralised citric acid. In one embodiment, the buffer comprises tartrate, preferably once neutralised tartaric acid.

In one embodiment, the buffer comprises a weak base and its conjugate acid.

Sweetener

It is preferred for the gel according to the invention to comprise a sweetener. Preferred sweeteners produce a sensation of sweetness in the mouth. Preferred sweeteners are a sugar or a sugar substitute or both; preferably a sugar. Preferred sugars in this context are built of one or two saccharide units. Preferred sugars are one or more selected from the group consisting of: sucrose, glucose, fructose and invert sugar syrup. Preferred sugar substitutes are one or more selected from the group consisting of: isomalt, mannitol, sorbitol and xylitol. In one embodiment the sweetener comprises a non hydrocolloidal poly sugar, preferably one or more selected from the group consisting of polydextrose and maltodextrin, more preferably maltodextrin.

Process for the Preparation of a Confectionery Item

A contribution to achieving at least one of the above mentioned objects is made by a process for the preparation of a confectionery item. The process preferably comprises the following process steps:

a. Providing a cartridge according to any of the preceding claims;
b. Heating the cartridge to turn the gel into a paste;
c. Ejecting the paste from the cartridge to obtain a shaped body;
d. Cooling the shaped body.

The heating in step b. is preferably at a temperature in the range from about 30 to about 100° C., preferably in the range from about 40 to about 80° C., more preferably in the range from about 55 to about 75° C., most preferably in the range from about 60 to about 70° C.

The paste obtained in step b. is preferably a fluid, more preferably a viscous fluid.

The ejecting step c. is preferably a printing, more preferably a 3-D printing.

The cooling in step c. is preferably to a temperature in the range from about 10 to about 40° C., preferably in the range from about 15 to about 30° C., more preferably in the range from about 20 to about 25° C.

Kit

A contribution to achieving at least one of the above mentioned objects is made by a kit comprising two or more cartridges. It is preferred for at least two of the cartridges to be different to each other, thereby allowing the preparation of confectionery items which differ in at least one intrinsic property, preferably one or more of the following:

a. Flavour
b. Colour
c. Calorie content
d. Suitability of vegetarians or vegans or both
e. Consistency, wherein the consistency is preferably one or more selected from the group consisting of: texture and density.

In a preferred aspect a combination of the above criteria selected from the following list are satisfied: a, b, ab, c, ac, bc, d, ad, bd, cd, e, ae, be, ce, de, abc, abd, acd, abe, ace, ade, bcd, bce, bde, cde, abcd, abce, abde, acde, bcde, abcde.

Test Methods

The following test methods are to be employed in the context of this application. Unless oth-erwise stated, the tests are to be carried out at a temperature of 25° C., a pressure of 100 kPa and a relative air humidity of 50%.

Shore Hardness A

Shore hardness A is measured according to the method of VDI/VDE 2516-page 2 (2004-04): "Härteprüfung an Kunststoffen und Gummi".

Bloom Value

The Bloom value was measured using a bloom gelometer. The method described in United States Pharmacopeia XX, S. 1017 (1990).

Isoelectric Point

The isoelectric point is measured as the pH value at which the solubility of the test substance is at a minimum. The minimum in the solubility is detected as the pH at which the extinction coefficient at 500 nm is at a maximum.

Water Content

Water content is measured using a Sartorius MA 30 moisture detector (obtainable from Sartorius AG, Gottingen, Germany), a disposable aluminium tray and a spoon. The moisture detector is not pre-warmed before the measurement. Between measurements, the moisture detector is left to stand for at least 15 minutes with the hood open. The moisture detector is turned on. The following measurement parameters are used: 105° C. (Drying temperature), Auto, 0-100%. The hood is opened and the aluminium tray set in position. The weighing scale is tared. A sample with a mass in the range from 5 to 5.5 g is provided. The aluminium tray is placed on a table and the sample is positioned evenly onto the tray. The tray is placed on the tray holder and the hood closed. The moisture detector starts the measurement process automatical-ly. The moisture detector shows "END" when the measurement is complete.

pH

A 5 g sample is dissolved in 95 g distilled water. The obtained solution is tested for pH with a WTW pocket pH Meter.

USA-SAG

A glucose-water gel with 65% by weight of dry matter and a pH value of 2.2 was used as a standard reference sample. The sample is set as a gel in the standard beaker. The sample is removed from the beaker and the percentage change in the height under of the sample under its own weight in a set time in a set time is measured. The standard reference gel sinks 23.5% in 2 minutes. The USA-SAG value of the test sample is the amount in gram of glucose which has to be added to 1 g of the test sample in 95 g water in order for the same proportional reduction in height to be observed in 2 minutes. The higher the USA-SAG value, the higher the gelling capability of a pectin.

Determination of Acid Content

Acid content is determined by titration with NaOH. A 5 g sample is placed in a 250 ml glass flask. 100 ml deionized water is added to the flask and the sample is dissolved in the water under stirring. The flask and contents are brought to 25° C. 0.1 M NaOH(aq) is added to the flask under stirring until the pH reaches 8.7, as measured by a pH meter. The acid content, expressed as a percentage of the total weight of the sample, is given by the following formula:

Acid content=$V \cdot 0.64/m$ wherein V is the volume of 0.1 M NaOH added, and m is the mass of sample tested.

Complex Viscosity, Storage Modulus and Loss Modulus

Complex viscosity, in phase storage modulus and out of phase loss modulus are determined using a Rheometrics ARES rheometer set to 10 rads/s and 1% sheer amplitude. The sample is mounted between 2 parallel 25 mm plates and heated to the desired temperature in a nitrogen atmosphere.

EXAMPLES

The following examples serve to further elucidate the invention without limiting its scope. The figures are not drawn to scale.

Preparation of the Precursor Mass.

375 g EU category 2 sugar from Pfeifer and Langen Gmbh & Co. KG, and an amount of pectin as per table 1 with a USA-SAG value of 170° USA-SAG from Cargill Gmbh as the poly suger were mixed dry in a 5 1 batch cooker in order to avoid clumping. 57 g maltodextrin from Roquette SA (oligomer) and 22.2 g of a buffer of KNa-tartrate and K-citrate were added. To this dry mixture was added 223 g water to obtain a honey-like milky phase. 295 g glucose syrup from Roquette SA with a water content of 20.5 wt. % was added under stirring. The mixture was heated to 108° C. and maintained at that temperature until it had a water content of 20 wt. %. It was then cooled to 90° C. to obtain the first mixture. Anhydrous citric acid was dissolved in water in a weight ration of 1:0.7 (citric acid:water). An amount of the citric acid solution was added to 100 g of the first mixture and mixed to obtain a second mixture with a content of added acid as given in Table 1. The second mixture was immediately transferred to a sterile syringe with an exit channel with an internal diameter of 1 mm, and the syringe closed to give a sterile, air free seal. The filled syringe was cooled to 20° C. for the mixture to set as a gel. The cooled syringe was stored for 1 hour.

Printing

The filled syringe was heated to 65° C. to convert the gel into a paste. The paste was ejected to print 5.5 cm lines, stacked to obtain a wall of height 1 cm.

Results

The results for printing the shape as described above are displayed in table 1. For each value of the mass of pectin, the printability and stability of the final product were determined. In example 1, the printability was good, but the gel did not set well and the wall collapsed. In example 3, the printability was poor. In example 2, the printability was good and the printed wall kept its shape.

TABLE 1

| ex # | pH | Acid titration [%] | Added acid g/kg* | Dry weight %** | Added pectin g/kg* | Added buffer g/kg* | CARTRIDGE RANKING | PRINT RANKING | GEL RANKING |
|---|---|---|---|---|---|---|---|---|---|
| 1 | 3.98 | 1.5 | 11.7 | 80.0 | 30.3 | 24.6 | 1.5 | 1.5 | 1.4 |
| 2 | 3.85 | 1.8 | 13.4 | 80.0 | 30.3 | 24.6 | 2.0 | 2.0 | 2.0 |
| 3 | 3.76 | 1.9 | 15.7 | 80.0 | 30.3 | 24.6 | 2.0 | 2.5 | 2.5 |
| 4 | 3.71 | 2.1 | 17.4 | 80.0 | 30.3 | 24.6 | 2.0 | 1.5 | 2.5 |
| 5 | 3.54 | 2.7 | 23.0 | 80.0 | 30.3 | 24.6 | 3.0 | 1.0 | 3.0 |
| 6 | 3.95 | 1.3 | 10.0 | 80.0 | 30.3 | 24.6 | 1.0 | 3.0 | 2.2 |
| 7 | 4.11 | 1.0 | 7.7 | 80.0 | 30.3 | 24.6 | 1.0 | 3.0 | 2.7 |
| 8 | 4.25 | 1.0 | 5.9 | 80.0 | 30.3 | 24.6 | 1.0 | 4.0 | 3.3 |
| 9 | 3.98 | 1.5 | 11.7 | 76.0 | 30.3 | 24.6 | 1.0 | 3.0 | 2.3 |
| 10 | 3.98 | 1.5 | 11.7 | 78.0 | 30.3 | 24.6 | 1.0 | 1.5 | 1.7 |
| 11 | 4.10 | 1.7 | 11.7 | 80.0 | 45.1 | 36.8 | 2.0 | 2.5 | 1.8 |
| 12 | 4.05 | 2.0 | 13.4 | 80.0 | 45.1 | 36.8 | 2.5 | 3.0 | 2.5 |
| 13 | 4.00 | 2.1 | 15.7 | 80.0 | 45.1 | 36.8 | 2.5 | 3.5 | 3.0 |
| 14 | 3.97 | 2.2 | 17.4 | 80.0 | 45.1 | 36.8 | 2.5 | 4.0 | 3.8 |
| 15 | 3.79 | 2.8 | 23.0 | 80.0 | 45.1 | 36.8 | 2.5 | 4.0 | 3.8 |
| 16 | 4.21 | 1.4 | 10.0 | 80.0 | 45.1 | 36.8 | 2.0 | 1.5 | 1.5 |

TABLE 1-continued

| ex # | pH | Acid titration [%] | Added acid g/kg* | Dry weight %** | Added pectin g/kg* | Added buffer g/kg* | CARTRIDGE RANKING | PRINT RANKING | GEL RANKING |
|---|---|---|---|---|---|---|---|---|---|
| 17 | 4.35 | 1.0 | 7.7 | 80.0 | 45.1 | 36.8 | 1.5 | 1.5 | 1.7 |
| 18 | 4.39 | 1.0 | 5.9 | 80.0 | 45.1 | 36.8 | 1.5 | 3.0 | 2.7 |
| 19 | 3.60 | 1.5 | 11.7 | 80.0 | 30.3 | 12.3 | 3.0 | 2.5 | 3.2 |
| 20 | 4.10 | 1.5 | 11.7 | 80.0 | 30.3 | 36.9 | 1.0 | 3.5 | 2.3 |
| 21 | 3.84 | 1.8 | 11.7 | 80.0 | 45.5 | 24.6 | 3.0 | 5.0 | 4.3 |
| 22 | 3.98 | 1.37 | 11.7 | 80.0 | 15.15 | 24.6 | 1.0 | 4.0 | 2.8 |
| 23 | 3.80 | 1.4 | 11.7 | 80.0 | 60 | 24.6 | 3.0 | 4.0 | 5.0 |

For Cartridge Ranking: 1 = good, 2 = poor, 3 = fail
For Printing rankings: 1 = good, 2 = fair, 3 = poor, 4 = fail
For gel rankings: 1 = very good, 2 = good, 3 = fair, 4 = poor, 5 = fail
*The value for added acid is given as the mass of added anhydrous acid [g] to make 1 kg of gel. The value for added buffer is given as the mass of added buffer [g] to make 1 kg of gel. The value for added pectin is given as the mass of added pectin [g] to make 1 kg of gel.
**Dry weight is also known as dry substance.

For cartridge ranking, a ranking of 1 (good) was given if the cartridge filled easily. A ranking of 2 (fair) was given if the cartridge was hard to fill or bubbles formed. A ranking of 3 (fail) was given if the filling of the cartridge failed.

For printer ranking, a ranking of 1 (good) was given if the material printed easily and continuously. A ranking of 2 (fair) was given if the material printed well, but with adaptations necessary. A ranking of 3 (poor) was given if any discontinuities were observed in the printed form or where large adaptations were required for printing. A ranking of 4 (fail) was given if the printing failed.

For gel ranking, a ranking of 1 (very good) was given if the printed gel had a good consistency and a good surface texture. A ranking of 2 (good) was given if the printed gel had a good consistency and a moderate surface texture or a good surface texture and a moderate consistency. A ranking of 3 (fair) was given if the printed gel had a moderate consistency and a moderate surface texture. A ranking of 4 (poor) was given if either of the consistency or the surface texture was poor and the other was poor or better. A ranking of 5 (fail) was given if either the consistency or surface texture was critically poor. A sticky surface constitutes a poor surface texture. Too soft a gel constitutes a poor consistency.

For example 1, the Shore hardness A of the gel was measured to be 21 and the Shore hardness A of the paste was measured to be 3.

FIGURES

Figure 2:
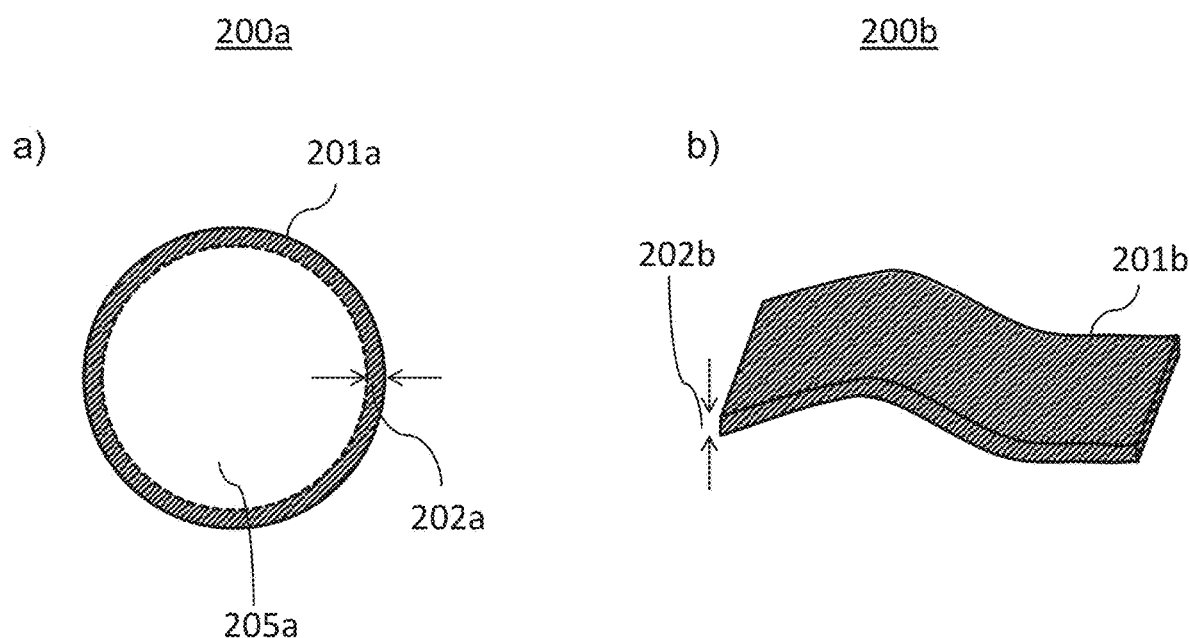
Figure 3:
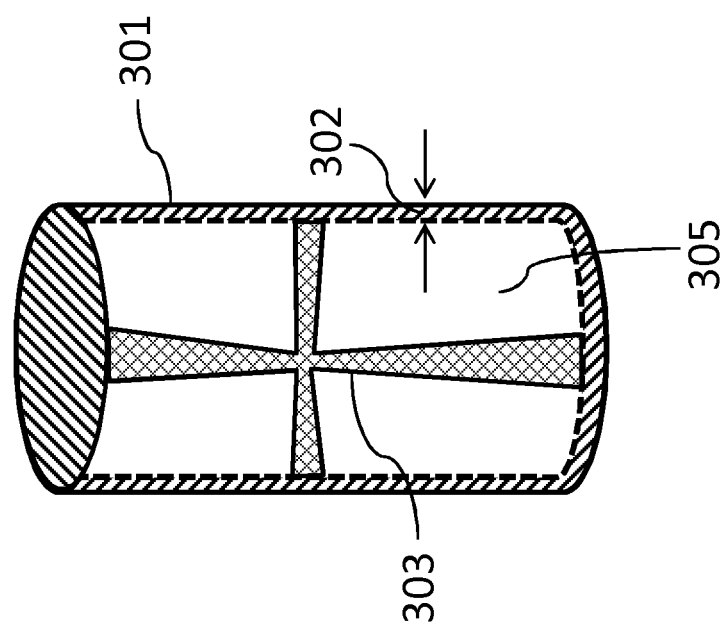
Figure 4:
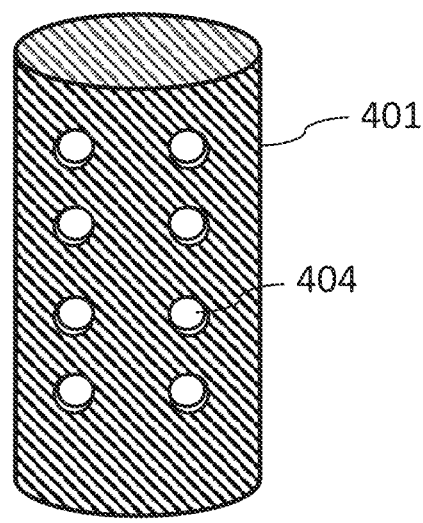
Figure 5:
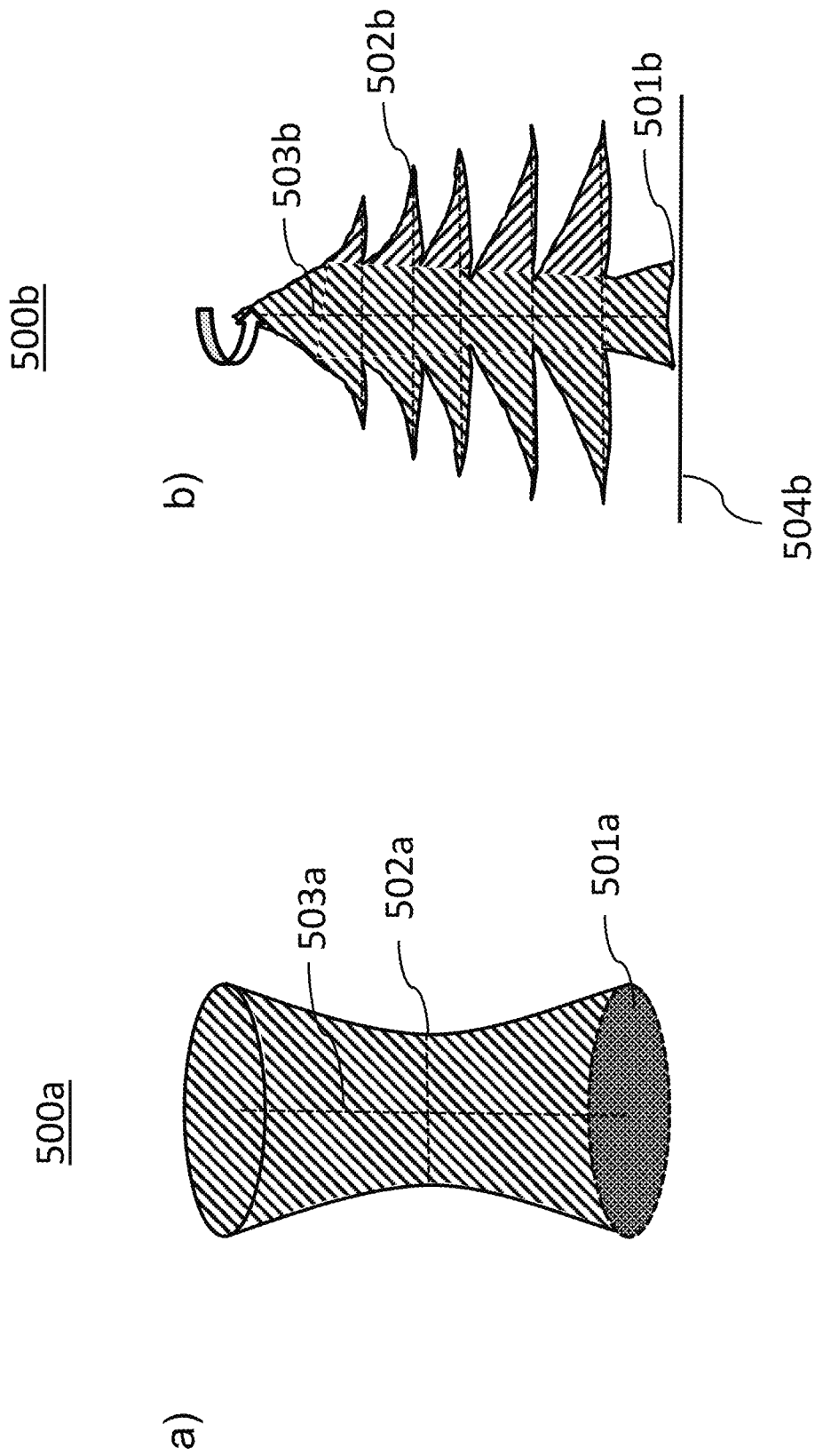
Figure 6:
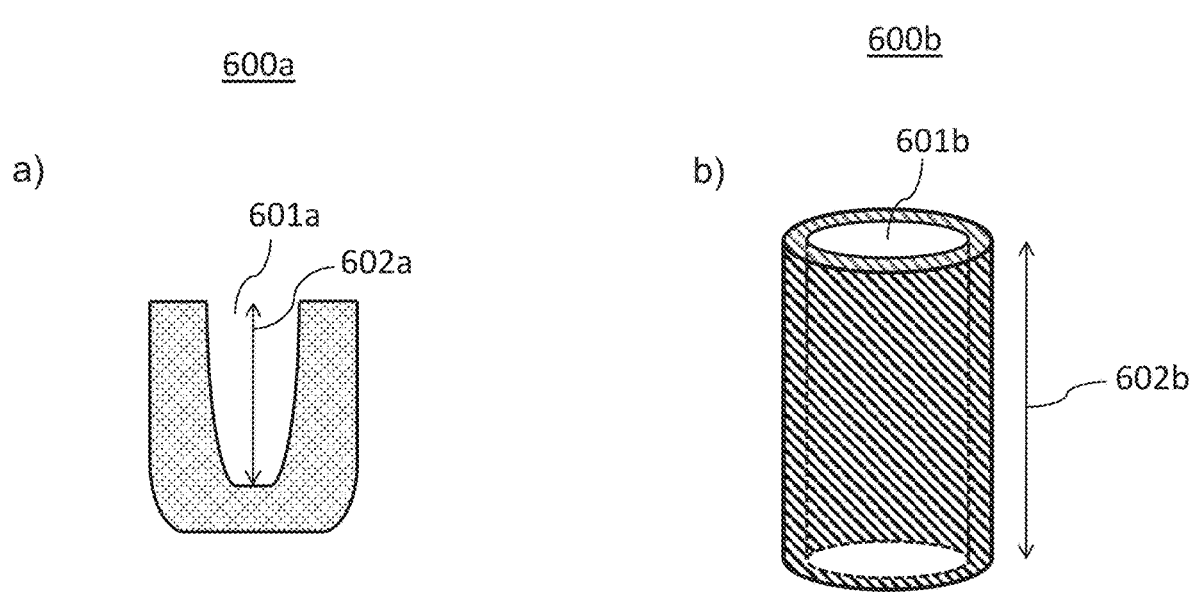
Figure 7:
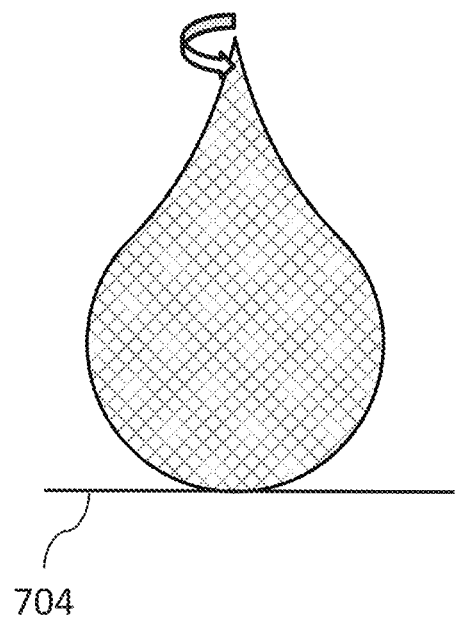

The figures show the following:

FIG. 1 A schematic diagram of a cartridge;

FIG. 2a) A schematic cross-section of a confectionery item;

FIG. 2b) A schematic diagram of further confectionery item;

FIG. 3 A schematic cross section of a further confectionery item;

FIG. 4 A schematic diagram of a further confectionery item;

FIG. 5a) A schematic diagram of a further confectionery item;

FIG. 5b) A schematic diagram of a further confectionery item;

FIG. 6a) A schematic cross-section of a further confectionery item;

FIG. 6b) A schematic cross-section of a further confectionery item;

FIG. 7 A schematic diagram of a further confectionery item;

FIG. 8 A schematic diagram of a device for preparing a confectionery item.

FIG. 1 shows a cartridge 100 according to the invention. A rigid container 104 has an internal volume 102 filled with gel 103. The cartridge 100 has a nozzle 106 with an opening 107 and a plunger 101 which can move in a direction 105. In use, the cartridge is heated such that the gel 103 melts to give a paste, and the plunger 101 is oved in the direction 105 in order to reduce the internal volume 102 and eject the paste out of the opening 107.

FIG. 2a) shows a schematic cross-section of a confectionery item 200a according to the invention, preferably a fruit gum. The confectionery item 200a consists of a wall 201a with a wall thickness 202a of 2 mm. The wall entirely contains an inner volume 205a. The confectionery item 200a is a hollow sphere.

FIG. 2b) shows a schematic diagram of a confectionery item 200b according to the invention, preferably a wine gum. The confectionery item 200b has a wall 201b. The wall 201b has a wall thickness 202b of about 3 mm. The confectionery item is a corrugated sheet.

FIG. 3 shows a schematic cross-section of a further confectionery item 300 according to the invention, preferably a fruit gum. The confectionery item 300 has a wall 301 with a wall thickness 302 of about 1 mm. The wall entirely contains an inner volume 305. The confectionery item 300 is a hollow cylinder with closed ends and with a supporting structure 303 in its internal volume 305.

FIG. 4 shows a schematic diagram of a further confectionery item 400 according to the invention, preferably a fruit gum. The confectionery item 400 has a wall 401 with a wall thickness of 2 mm. The wall entirely contains an internal volume. The confectionery item 400 is a hollow cylinder with 8 openings 404 in the wall 401.

FIG. 5a) shows a schematic diagram of a further confectionery item 500a according to the invention, preferably a foam gum. The confectionery item 500a has a basal surface 501a, and is characterised by a line of height 503a perpendicular to the basal surface 501a defining height above the basal surface 501a and a diameter 502a extending perpendicular to the line of height 503a, wherein the diameter 502a has two local maxima.

FIG. 5b) show a schematic diagram of a further confectionery item 500b according to the invention, preferably a fruit gum. The confectionery item 500b has the 3-dimensional shape of a pine tree. The arrow indicates a rotational symmetry of the confectionery item 500b. The confectionery item 500b has a basal surface 501b, and is characterised by a line of height 503b perpendicular to the basal surface 501b defining height above the basal surface 501b and a diameter 502b extending perpendicular to the line of height 503b, wherein the diameter 502b has five local maxima. The basal surface 501b allows the confectionery item 500b to be attached to a base 504b. Drying of the confectionery item 500b causes the basal surface not to be planar. Attachment to the base 504b allows the confectionery item 500b to be stood up.

FIG. 6a) shows a schematic cross-section of a further confectionery item 600a according to the invention. The confectionery item comprises a hole 601a with a depth 602a of 10 mm. The hole 601a is a depression. The confectionery item 600a is basin shaped.

FIG. 6b) show a schematic diagram of a further confectionery item 600b according to the invention, preferably a fruit gum. The confectionery item 600b comprises a hole 601b with a depth 602b of 20 mm. The hole 601b is a channel which penetrates the item entirely. The confectionery item 600b is an open ended cylinder.

FIG. 7 shows a schematic diagram of a further confectionery item 700 according to the invention, preferably a wine gum. The confectionery item 700 has no basal surface and in particular comprises no flat plane surfaces. Furthermore, the confectionery item 700 can not be placed stable on a base 704. The arrow indicates a rotational symmetry of the confectionery item 700.

FIG. 8 shows a schematic diagram of a device 800 according to the invention for the preparation of confectionery items 200a, 200b, 300, 400, 500a, 500b, 600a, 600b, and 700. The device comprises a nozzle 801, comprising an exit opening 802 and a cartridge 804. The exit opening 802 of the nozzle 801 is characterised by a cross sectional surface area of 1 mm². The nozzle 801 is in fluid connection with the cartridge 804. The cartridge 804 contains the gel of the invention. The cartridge is connected to a means of expelling the gel, in this case a pressurised gas source 815. The nozzle 801 is arranged over a substrate 803. The nozzle 801 can be made to trace a 3 dimensional shape in a three dimensional working volume 809 above the substrate 803 by means of a track system 812, a lifting system 810 for vertical translation of the substrate 803 (each indicated by arrows) and motors 807. In this way, the device 800 can be used for preparing confectionery items 200a, 200b, 300, 400, 500a, 500b, 600a, 600b, and 700 with a variety of shapes within the working volume. The 3-D trajectory of the nozzle 801 and the ejection of the precursor material from the nozzle 801 is controlled by a computer 806. The computer 806 further comprises a hard disk on which CAD modules for a variety of shapes are stored. The computer controlled movement of the exit opening 802 traces a 3 dimensional shape lying within the working volume 809. During the movement along the 3 dimensional trajectory 808, the separation 810 between the substrate and the exit opening increases monotonically.

REFERENCE LIST

100 Cartridge
101 Plunger
102 Internal volume
103 Gel
104 Rigid container
105 Direction of plunger motion
106 Nozzle
107 Exit opening
200a, 200b, 300, 400, 500a, 500b, 600a, 600b, and 700 Confectionery items
201a-b, 301, 401 Wall
202a-b, 302 Wall thickness
303 Support structure
404 Opening
205a, 305 Internal volume
501a-b Basal surface
502a-b Diameter
503a-b Height
504b, 704 Base
601a-b Hole
602a-b Depth
800 Device
801 Nozzle
802 Exit opening
803 Substrate
804 Cartridge
806 Computer
807 Motor
808 3 dimensional trajectory
809 3 dimensional working volume
810 Separation between exit opening and substrate
812 Track system
813 Lifting system
815 Pressurised gas source

The invention claimed is:
1. A cartridge comprising:
a container having an internal volume; wherein the container comprises a first set gel comprising:
  i. a hydrocolloid, and
  ii. a sweetener different to the hydrocolloid;
wherein the hydrocolloid is a pectin;
wherein the first set gel is not a fluid;
wherein when the cartridge is heated to 80° C., the first set gel becomes a paste, wherein the paste is more fluid than the first set gel; and wherein the cartridge is adapted for ejecting the paste;
wherein when the paste is cooled to below 10° C., the paste becomes a second gel, wherein the second gel is not a fluid; and
wherein the cartridge further comprises an exit hole or provision for an exit hole to be made, and wherein the exit hole is adjusted to be mounted in a 3-D printer.

2. The cartridge according to claim 1, wherein the hydrocolloid is a poly sugar.

3. The cartridge according to claim 1, wherein the first set gel comprises an acid.

4. The cartridge according to claim 1, wherein the first set gel satisfies one or more of the following criteria:
  a. A Shore hardness A ranging from about 1 to about 70, measured at 25° C.;
  b. a complex viscosity ranging from about 2000 to about 10000 Pa·s;
  c. a loss modulus ranging from about 4000 to about 20000 Pa; or
  d. a storage modulus ranging from about 20000 to about 70000 Pa.

5. A process for preparing an item of confectionery comprising:
  a. heating the cartridge of claim 1 to turn the first set gel into a paste, wherein the first set gel is not a fluid and wherein the paste is more fluid than the first set gel;
  b. ejecting the paste from the cartridge to obtain a shaped body;
  c. cooling the shaped body.

6. The process according to claim 5, wherein the paste is ejected in step c through an outlet which traces a 3-D trajectory.

7. A kit comprising two or more cartridges according to claim 1.

8. The process of claim 5, further comprising filling the cartridge with the first set gel.

9. The kit of claim 7, wherein the first set gel in each of the two or more cartridges is different.

10. The cartridge of claim 1, wherein the first set gel comprises 1 wt. % to 10 wt. % of the hydrocolloid based on the total weight of the first set gel.

11. The cartridge of claim 1, wherein the first set gel has a pH in the range from 2 to 5.5.

12. The cartridge of claim 1, wherein the container is rigid.

13. The cartridge according to claim 1, wherein the content of pectin is in the range from 2.5 to 6 wt %.

14. The cartridge according to claim 1, wherein the first set gel is not printable.

15. A cartridge comprising:
a container having an internal volume; wherein the container comprises a first gel comprising:
   i. a hydrocolloid, and
   ii. a sweetener different from the hydrocolloid;
wherein the hydrocolloid is a pectin;
wherein the first gel is not a fluid and is not printable;
wherein when the cartridge is heated to 80° C., the first gel becomes a paste, wherein the paste is more fluid than the first gel; and wherein the cartridge is adapted for ejecting the paste, and
wherein when the paste is cooled to below 10° C., the paste becomes a second gel wherein the second gel is not a fluid;
   wherein the cartridge further comprises an exit hole or provision for an exit hole to be made, and wherein the exit hole is adjusted to be mounted in a 3-D printer.

\* \* \* \* \*